United States Patent [19]

Anthony

[11] 4,417,623

[45] Nov. 29, 1983

[54] SAND CONSOLIDATION WITH ORGANIC SILICATE

[75] Inventor: Donald R. Anthony, Plano, Tex.

[73] Assignee: Atlantic Richfield Company, Los Angeles, Calif.

[21] Appl. No.: 329,497

[22] Filed: Dec. 10, 1981

[51] Int. Cl.$^3$ ............................................. E21B 33/138
[52] U.S. Cl. .................................................... 166/294
[58] Field of Search ............... 166/294, 292, 300, 276; 405/264

[56] References Cited

U.S. PATENT DOCUMENTS

| | | | |
|---|---|---|---|
| 2,259,875 | 10/1941 | Bent et al. | 166/294 X |
| 2,281,810 | 5/1942 | Stone et al. | 166/294 X |
| 3,022,825 | 2/1962 | Winsaurer et al. | 166/295 |
| 3,327,783 | 6/1967 | Ayers | 166/295 X |
| 3,500,928 | 3/1970 | Rockwell | 166/294 X |
| 4,081,029 | 3/1978 | Holm | 166/292 X |

*Primary Examiner*—Stephen J. Novosad
*Assistant Examiner*—Michael Starinsky
*Attorney, Agent, or Firm*—M. David Folzenlogen

[57] ABSTRACT

Unconsolidated sand-like material in a subsurface formation adjacent a borehole of a water, oil, or gas well is consolidated by treating the formation first with a solution of alcohol and organic silicate and then with water. The water causes the organic silicate to hydrolyze and polymerize into a coating-like binding agent. The water also flushes excess organic silicate-alcohol solution from the more permeable portions of the formation adjacent the borehole, thereby maintaining the formation's permeability. The silicate solution may be preceded by alcohol without silicate. Organic silicate has many advantages over alkali metal silicate.

10 Claims, No Drawings

SAND CONSOLIDATION WITH ORGANIC SILICATE

BACKGROUND OF THE INVENTION

This invention pertains to the consolidation or strengthening of unconsolidated sand-like material in a subsurface formation near the borehole of a water, oil or gas well. More particularly, an organic silicate alcohol solution is injected into a subsurface formation to thereafter react with water and consolidate the formation while leaving it permeable to the flow of water, oil or gas from the formation.

Many processes have been proposed for consolidating sands in a subsurface formation. For example, U.S. Pat. No. 3,592,267 discloses the use of an emulsion of an aqueous solution of an alkali metal silicate in a hydrocarbon liquid followed by an aqueous solution containing a silicate precipitator. Alkali metal silicates are soluble in water and require precipitation or reaction with special substances to set up. The method of U.S. Pat. No. 3,592,267 also has the usual drawbacks of creating and handling an emulsion. For example, there is less flexibility in the formation of a stable emulsion. In addition, it is difficult to wet the sand properly with an aqueous solution of silicate when the silicate is in a water-in-oil type emulsion with the silicate solution being the suspended phase and the oil being the continuous phase. Moreover, the movement of an emulsion into the less mobile areas of the interstices of sand particles adjacent a borehole is difficult to predict.

SUMMARY OF THE INVENTION

In the method of the present invention, an unconsolidated subsurface formation adjacent a borehole is treated with an alcohol solution of an organic silicate followed by a water flush. Organic silicates are practically insoluble in water and are hydrolyzed by a proton source water to polymerize into a coating-like binding agent which holds the loose sand-like materials in the unconsolidated formation together. Organic silicates are miscible with alcohol, thereby allowing for a wide variation in concentration of silicate in the solution. The flow and wetting properties of a single phase alcohol-silicate solution are readily controlled and remain constant until the silicate solution either disperses into residual waters in the interstices of the formation or until the silicate solution is flushed from adjacent the borehole by injecting water into the formation. Water causes the residual organic silicate to polymerize and consolidate the formation while leaving it permeable to the flow of the formation fluids. The organic silicate solution has further advantages not present with alkali metal silicates. For example, some of the alcohol-silicate solution reacts with residual formation waters that are in the less mobile areas of the formation not swept by both the silicate-alcohol solution and the flush water.

DETAILED DESCRIPTION OF THE PREFERRED EMBODIMENTS

The present method is employed in a well traversing a subsurface formation containing unsolidated sand-like material. In the method, a predetermined volume of a solution of alcohol and organic silicate is injected into a borehole to eventually flow into the pore spaces of the part of an unconsolidated water, oil or gas producing formation to be treated. The silicate solution is followed by injection of a flush water. Generally, the treated portion of the formation is impregnated with about 0.25 to 30 gallons of organic silicate solution per vertical foot of formation and with a similar or greater amount of flush water. Perforated wells require less solution than open boreholes. Generally, the silicate solution will contain between 5% and 95% by volume of organic silicate and between 5% and 95% alcohol. The amounts and concentrations are dependent on the formation characteristics which vary widely from formation to formation. The concentration of organic silicate will be such that the permeability of the formation is not decreased to an undesirable extent. At the same time, the concentration will be high enough to consolidate many of the loose sand-like materials in the part of the formation treated. It is unlikely that an excess of organic silicate solution will damage the formation because the surface tension between the organic silicate-alcohol solution and formation water is relatively low. The alcohol-silicate injection stage, therefore, displaces mobile formation water from the higher permeability portions of the formation which are to remain open after the silicate has polymerized. There is, therefore, no water in these higher permeability portions to polymerize the silicate. Moreover, in a similar fashion, the flush water injection stage of the process displaces most of the organic silicate-alcohol solution from the higher permeable portions of the formation. The silicate, therefore, does not plug the higher permeability portions of the formation near the borehole.

The organic silicate solution is injected into the borehole at a rate and volume which causes the solution to permeate the part of the formation to be treated and flow into the interstices of sand-like material in the formation and to coat the sand-like particles with organic silicate. If all of the water in the formation has not been removed, some of the solution will contact the less reducible or irreducible formation waters which almost all water, oil or gas producing formations contain. The organic silicate contacting residual water in the formation will in most cases start to cure in the areas of the formation that are of little importance to the water, oil or gas production of the formation; but that are useful to sand consolidated. It should be noted that the remainder of the organic silicate remains unaffected until it is contacted with water.

After injection of the desired amount of organic silicate-alcohol solution, a proton source water, for example, water that is slightly acidic or that contains a salt of a weak base and strong acid, is injected into the borehole in amounts and at rates which flush or move much of the organic silicate solution into the formation away from the wellbore, thereby leaving organic silicate wet sand-like formation particles and some of the less mobile solution trapped or held in the interstices of the formation. The flush water causes this organic silicate to hydrolyze and form a coating-like binding agent which consolidates and strengthens the treated part of the formation while not unduly affecting the permeability of the formation to the production of water, oil or gas as the case may be.

In some cases, it is better to preflush the part of the formation to be treated with a liquid that will displace virtually all of the formation water. Accordingly, alcohol without organic silicate may be injected into the borehole before the organic silicate-alcohol solution is injected. Alcohol is a suitable preflush for formation waters because of its low surface tension coaction with water. Moreover, since the organic silicate solution is made up of alcohol and silicate and since organic silicate is miscible in alcohol, an alcohol preflush solution is readily displaced with the organic silicate-alcohol solution. This sort of preflush is especially desirable because it provides better location of full strength organic silicate solution in the pore spaces thereby providing more cured silicate to consolidate and strengthen the formation while retaining the desired degree of permeability.

Organic silicates are also called alkyl silicates and the most common commercially available alkyl silicate is tetraethyl silicate. An organic silicate ester may also be used. The hydrolytic curing reactions of tetraethyl silicate are given in equations (1) through (3) wherein R is $C_2H_3$.

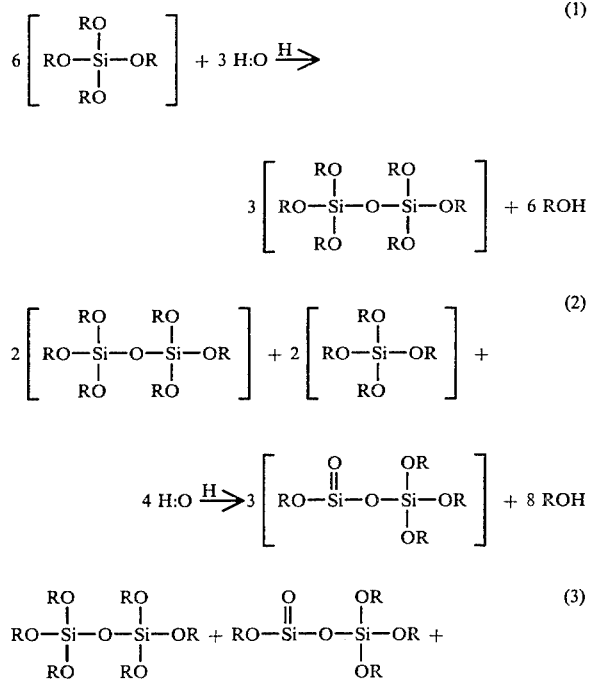

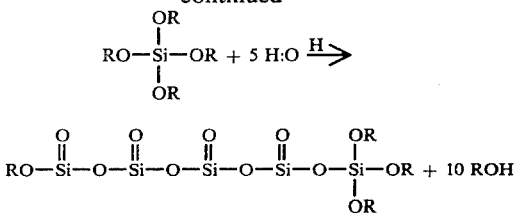

Reasonable variations and modifications are practical within the scope of the disclosure without departing from the spirit and scope of the claimed invention. For example, in addition to the aforementioned ingredients, other components or materials like selective wetting agents or viscosity control agents may be incorporated into any one or more of the liquids injected and inorganic metal salts, especially halides of weak bases, may be employed in the water flush-setting stage of the process.

The embodiments of the invention in which an exclusive property or privilege is claimed are defined as follows:

1. In a method for consolidating an unconsolidated sand-like material in a subsurface formation while leaving the formation permeable to the flow of fluids from the formation, the steps comprising (a) injecting an alcohol and organic silicate solution into said borehole, and (b) thereafter injecting water into said borehole.

2. In the method of claim 1 wherein before step (a), alcohol without organic silicate is injected into said borehole.

3. The method of claim 2 wherein the organic silicate is tetraethyl silicate.

4. The method of claim 1 wherein the water is a proton source water.

5. The method of claim 4 wherein the proton source water is an acid solution.

6. The method of claim 4 wherein the proton source water contains a salt of a weak base and a strong acid.

7. The method of claim 1 wherein the organic silicate is tetraethyl silicate.

8. The method of claim 7 wherein the water is a proton source water.

9. The method of claim 8 wherein the proton source water is an acid solution.

10. The method of claim 8 wherein the proton source water contains a salt of a weak base and a strong acid.

* * * * *